(12) United States Patent  
Lai

(10) Patent No.: US 10,789,677 B2  
(45) Date of Patent: Sep. 29, 2020

(54) IMAGE STITCHING PROCESSING METHOD AND SYSTEM THEREOF

(71) Applicant: Wistron Corp., New Taipei (TW)

(72) Inventor: Chang-Hsin Lai, New Taipei (TW)

(73) Assignee: WISTRON CORP., New Taipei (TW)

( * ) Notice: Subject to any disclaimer, the term of this patent is extended or adjusted under 35 U.S.C. 154(b) by 86 days.

(21) Appl. No.: 16/288,652

(22) Filed: Feb. 28, 2019

(65) Prior Publication Data

US 2020/0134782 A1 Apr. 30, 2020

(30) Foreign Application Priority Data

Oct. 24, 2018 (TW) .............................. 107137529 A

(51) Int. Cl.
| | |
|---|---|
| *G06T 3/40* | (2006.01) |
| *H04N 5/262* | (2006.01) |
| *G06K 9/00* | (2006.01) |
| *B60R 1/00* | (2006.01) |

(52) U.S. Cl.
CPC .............. *G06T 3/4038* (2013.01); *B60R 1/00* (2013.01); *G06K 9/00791* (2013.01); *H04N 5/2628* (2013.01); *B60R 2300/105* (2013.01); *B60R 2300/304* (2013.01); *B60R 2300/8066* (2013.01)

(58) Field of Classification Search
CPC .... G06T 3/4038; G06K 9/00791; B60R 1/00; B60R 2300/8066; B60R 2300/304; B60R 2300/105; H04N 5/247; H04N 5/23238; H04N 5/2628
See application file for complete search history.

(56) References Cited

U.S. PATENT DOCUMENTS

| | | | | |
|---|---|---|---|---|
| 9,204,041 | B1 * | 12/2015 | Campbell | ................ G03B 7/00 |
| 2010/0054628 | A1 * | 3/2010 | Levy | ..................... G06T 3/4038 |
| | | | | 382/284 |
| 2015/0312478 | A1 * | 10/2015 | Barcovschi | ........ H04N 5/23238 |
| | | | | 348/36 |
| 2018/0244199 | A1 * | 8/2018 | Gyori | ..................... H04N 7/181 |
| 2019/0272619 | A1 * | 9/2019 | Lim | ................... H04N 5/23238 |

* cited by examiner

*Primary Examiner* — Carol Wang

(57) ABSTRACT

An image stitching processing method includes: obtaining a first image taken by a first camera module, wherein the first camera module has a first distance from a reference plane; obtaining a second image taken by a second camera module, wherein the second camera module has a second distance from the reference plane; scaling the second image according to a predetermined ratio and stitching the scaled second image with the first image to obtain a third image, wherein the third image has a stitching line between the first image and the scaled second image; determining whether an object image corresponding to an object in the third image is close to or located on the stitching line; identifying the object image to generate an identification confidence value; covering a standard object image on the object image to generate a modified third image; and outputting and displaying the modified third image.

17 Claims, 13 Drawing Sheets

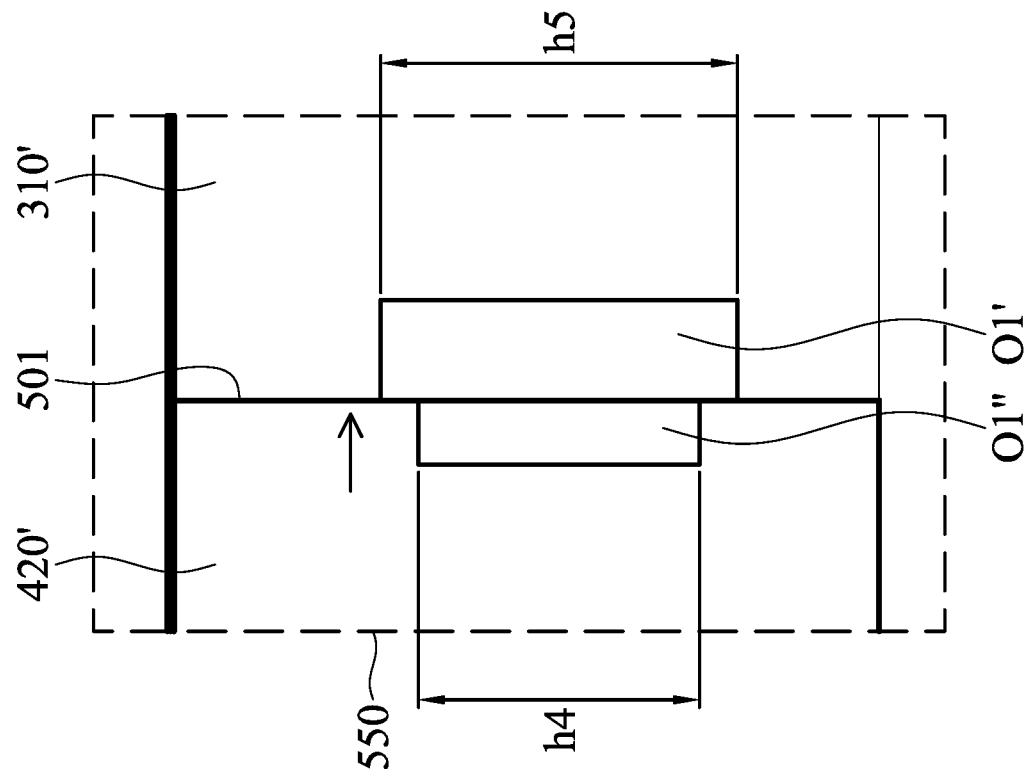
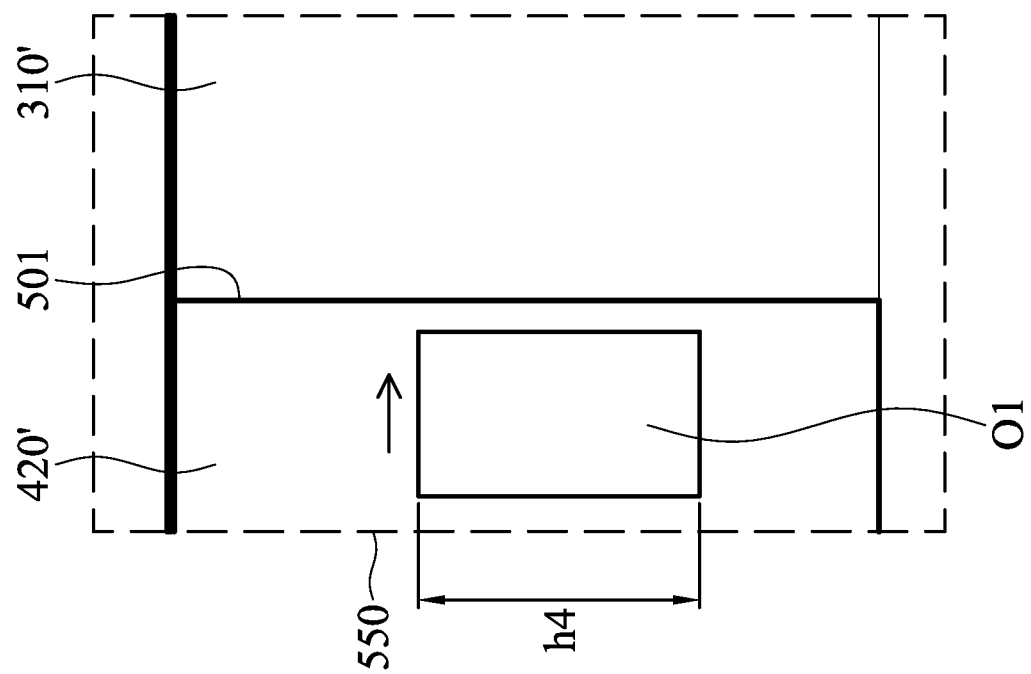
FIG. 7B
FIG. 7A

IMAGE STITCHING PROCESSING METHOD AND SYSTEM THEREOF

CROSS REFERENCE TO RELATED APPLICATIONS

This Application claims priority of Taiwan Patent Application No. 107137529, filed on Oct. 24, 2018, the entirety of which is incorporated by reference herein.

BACKGROUND

Field of the Invention

The present disclosure relates to an image stitching processing method and system thereof, and, in particular, to an image stitching processing method and an image stitching processing system for stitching multiple images into a single image.

Description of the Related Art

Advanced Driver Assistance Systems (ADAS) is one of the goals of smart vehicle development. In order to provide drivers with a wider angle of view, stitching multiple images with different angles of view is a common technique. However, in a conventional image stitching technique, when an object is placed on a stitching line of two images, the object in the stitching image may be abnormally displayed. Therefore, how to provide a normal object image in the stitching image is a problem that currently needs to be solved.

BRIEF SUMMARY

An embodiment of the present disclosure provides an image stitching processing method, including: obtaining a first image taken by a first camera module, wherein the first camera module is disposed a first distance from a reference plane; obtaining a second image taken by a second camera module, wherein the second camera module is disposed a second distance from the reference plane, and the second distance is different from the first distance; scaling the second image according to a predetermined ratio and stitching the scaled second image with the first image to obtain a third image, wherein the third image has a stitching line between the first image and the scaled second image; determining whether an object image corresponding to an object in the third image is close to or located on the stitching line; identifying the object image to generate an identification confidence value; covering a standard object image on the object image to generate a modified third image in response to the object image being close to or located on the stitching line and the identification confidence value of the object image being less than the first predetermined value; and outputting and displaying the modified third image.

Another embodiment of the present disclosure provides an image stitching processing system, comprising a first camera module, a second camera module, a processing unit, a storage unit, and a display unit. The first camera module is configured to obtain a first image, wherein the first camera module is disposed a first distance from a reference plane. The second camera module is configured to obtain a second image, wherein the second camera module is disposed a second distance from the reference plane, and the second distance is different from the first distance. The processing unit is configured to receive the first image and the second image from the first camera module and the second camera module; scale the second image according to a predetermined ratio and stitching the scaled second image with the first image to obtain a third image, wherein the third image has a stitching line between the first image and the scaled second image; determine whether an object image corresponding to an object in the third image is close to or located on the stitching line; identify the object image to generate an identification confidence value; and cover a standard object image on the object image to generate a modified third image in response to the object image being close to or located on the stitching line and an identification confidence value of the object image being less than the first predetermined value. The storage unit is configured to store the standard object image. The display unit is configured to display the modified third image.

Another embodiment of the present disclosure provides an image stitching processing method, including: obtaining a first image and a second image, wherein the first image is adjacent to the second image or the first image overlaps with at least a portion of the image content of the second image; scaling at least one of the first image and the second image according to a ratio, and stitching the scaled first image and the scaled second image or stitching the scaled one of the first image and the second images with the other to obtain a third image, wherein the third image has a stitching line between the scaled first image and the scaled second image or stitching the scaled one of the first image and the second images with the other; determining whether an object image in the third image is located on the stitching line; identifying the object image to generate an identification confidence value; covering a standard object image on the object image to generate a modified third image in response to the object image being located on the stitching line and the identification confidence value of the object image being less than the first predetermined value; and outputting and displaying the modified third image.

According an embodiment of the present disclosure, the processing unit further defines a target area that does not overlap the first image in the second image, and crops the second image according to the target area to obtain a sub-image; enlarges the sub-image according to the predetermined ratio to obtain the scaled second image; and stitches the first image with the scaled second image to obtain the third image. In an embodiment of the present disclosure, the processing unit defines an observation area by extending an equal distance from both sides of the stitching line, and determines whether the object image enters the observation area to determine whether the object image in the third image is close to the stitching line.

According another embodiment of the present disclosure, the processing unit further calculates the identification confidence value of the object image in response to the object image being close to or located on the stitching line; and the processing unit further stores the current object image as the standard object image in response to the identification confidence value being greater than a second predetermined value.

According another embodiment of the present disclosure, the first camera module and the second camera module are configured on a vehicle, and the processing unit further stops calculating the identification confidence value corresponding to the object image and/or stops covering the standard object image on the object image in response to the current speed of the vehicle being greater than a predetermined speed.

According to the image stitching processing method and system thereof in some embodiments of the present disclosure, when the stitched image captured and stitched by two or more camera modules by the object image is more completely presented, it is captured and stored in the storage unit in advance, and when the object image is at the stitching line or adjacent to stitching line and the stitched object image is abnormal, the complete object image is taken out from the storage unit to cover the distorted object image, so as to prevent the user making an incorrect judgment due to distorted object image.

BRIEF DESCRIPTION

FIGS. 7A and 7B illustrate another distortion of the object image, in accordance with some embodiments of the present disclosure.

DETAILED DESCRIPTION

Other aspects of the image stitching processing system and method for which the embodiments of the present disclosure will be apparent from the detailed description provided hereinafter. It is to be understood that the following detailed description, as well as specific embodiments, are intended to be illustrative of the embodiments of the present disclosure, and are not intended to limit the scope of the present disclosure.

Figure 1:
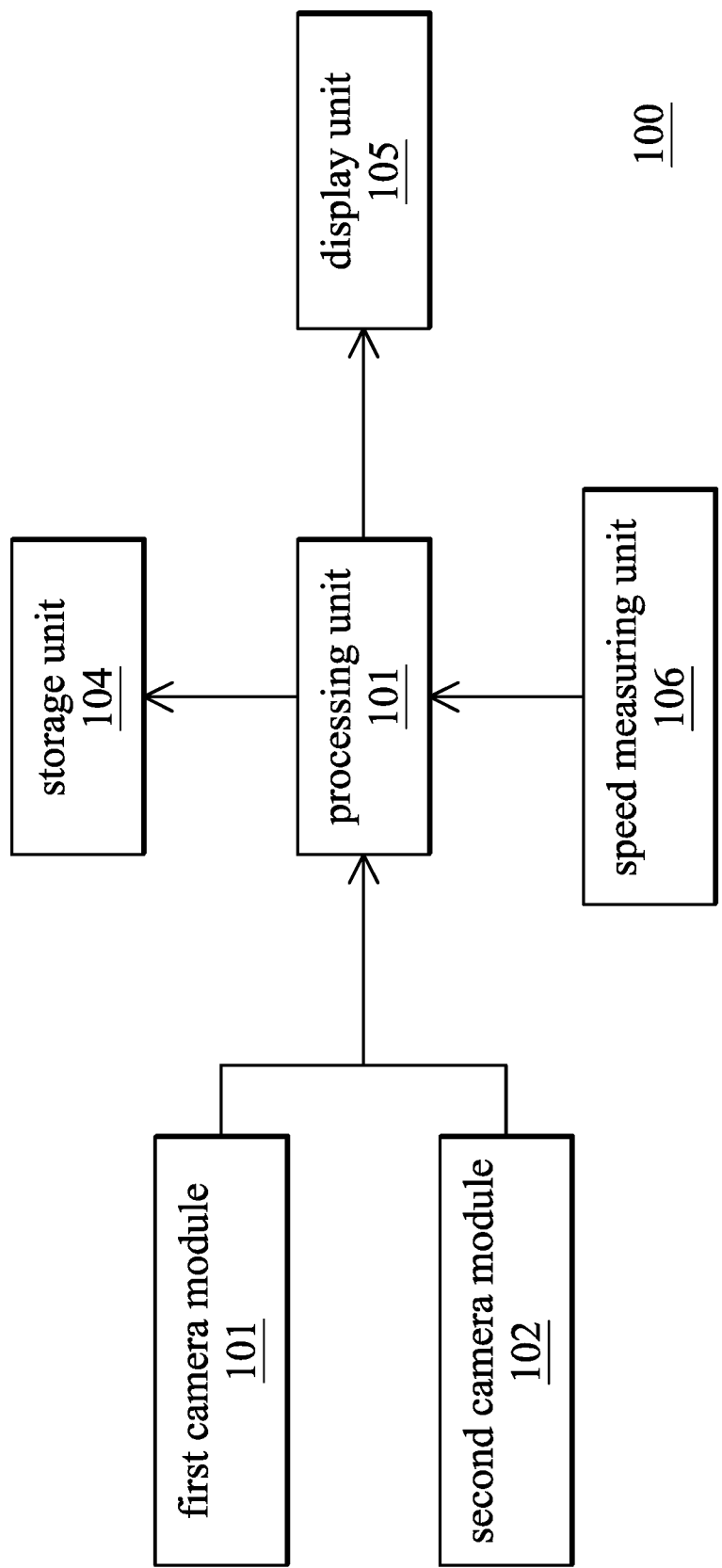
FIG. 1 illustrates a system architecture diagram of an image stitching processing system, in accordance with some embodiments of the present disclosure.

FIG. 1 illustrates a system architecture diagram of an image stitching processing system, in accordance with some embodiments of the present disclosure. According to some embodiments, the image stitching processing system 100 can be implemented in, for example, a driving computer (i.e., car computer), but can also be used in any electronic device having multiple lenses for central control, monitoring or recording. The image stitching processing system 100 at least includes a first camera module 101, a second camera module 102, a processing unit 103, a storage unit 104, a display unit 105, and a speed measuring unit 106 (optional). The first camera module 101 and the second camera module 102 are camcorders and/or cameras that can shoot (or obtain) continuous images or have charge coupled devices (CCDs) or complementary metal oxide semiconductors (CMOS) devices or any other sensing device for visible or invisible light, etc. The visible light camera is taken as an example for illustration in the following embodiments of the present disclosure. In some embodiments, the first camera module 101 and the second camera module 102 are disposed in different planes with respect to a reference plane. The first camera module 101 and the second camera module 102 have different distances from the reference plane, and are in the same direction, or at least a part of the field of view (FOV) of the first camera module 101 and the second camera module 102 overlap each other. The first camera module 101 and the second camera module 102 return the obtained images to the processing unit 103.

Figure 2A:
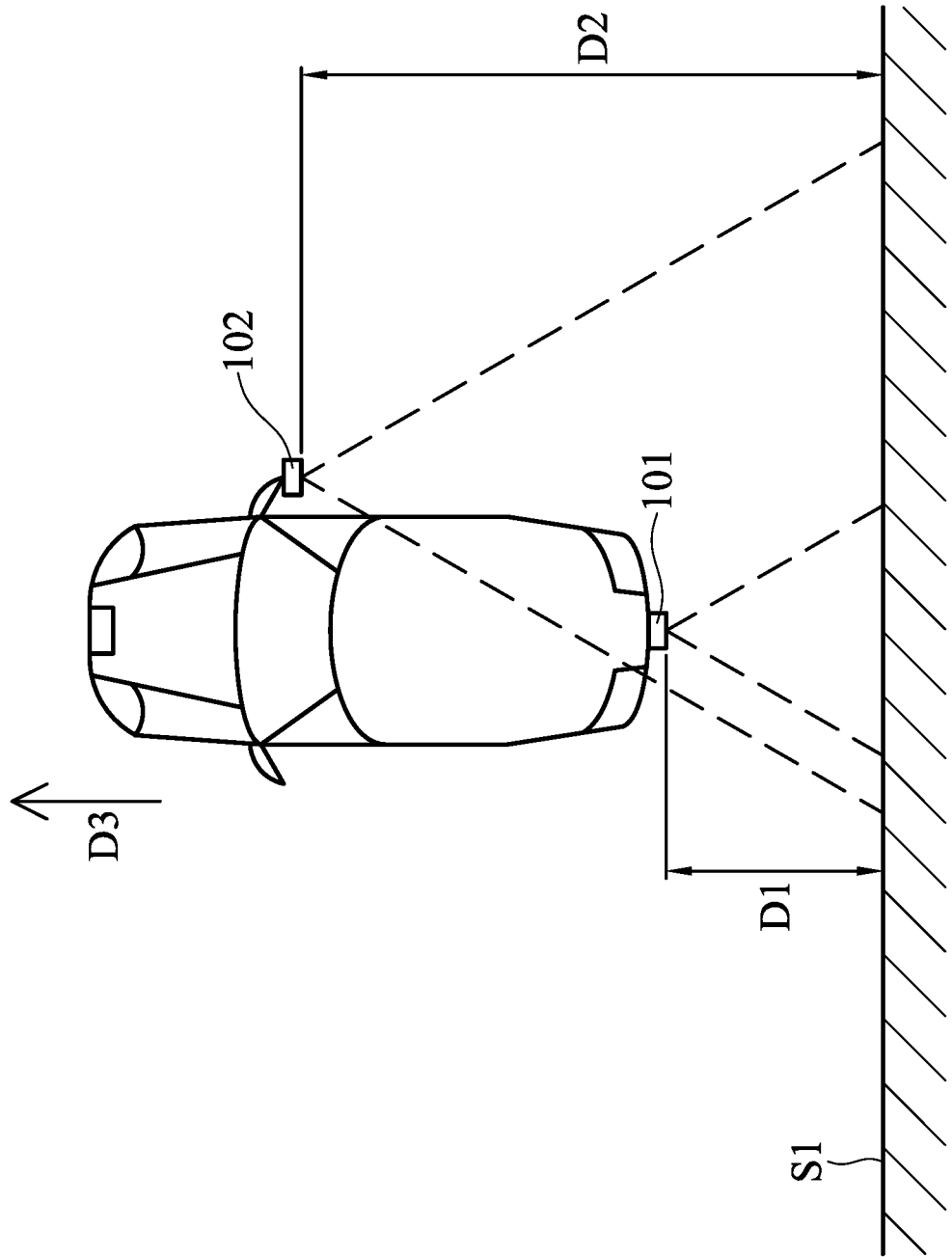
FIGS. 2A and 2B illustrate an arrangement of the first camera module and the second camera module, in accordance with some embodiments of the present disclosure.

For example, as shown in FIG. 2A, when the first camera module 101 and the second camera module 102 are disposed on the same vehicle (in this embodiment of the present disclosure, a car is taken as an example), the first camera module 101 can be disposed at the center of the rear of the vehicle (i.e., the first camera module 101 is disposed a first distance D1 from a reference plane S1). The second camera module 102 can be disposed at side view mirror (i.e., the second camera module 102 is disposed a second distance D2 from the reference plane S1). The second distance D2 is greater than the first distance D1, and the first camera module 101 and the second camera module 102 both face to the direction of the rear of the vehicle (D3 is the direction in which the vehicle is moving).

The processing unit 103 can be implemented in various manners, such as dedicated hardware circuits or general-purpose hardware (e.g., a single processor, a multi-processor with parallel processing capability, a graphics processor, or other processor with computing capability). When the code or software related to the embodiment of the present disclosure is executed, the functions described later are provided.

The storage unit 104 can be a hard disk, a flash memory, a dynamic random access memory, electrically-erasable programmable read-only memory (EEPROM), or the volatile or non-volatile storage device that containing at least two or more of the above and can be written data. The storage unit 104 is configured to store the images obtained by the first camera module 101 and the second camera module 102, the images processed by the processing unit 103, data required during process, and various electronic files and operation equations, etc. The display unit 105 can be a display panel (e.g., a thin film transistor liquid crystal display (TFT-LCD) panel, an organic light-emitting diode (OLED) panel, or other panel having display capability) for displaying images processed by the processing unit 103 for the user. In some embodiments, the image stitching processing system 100 further includes an image processing unit (not shown), disposed between the first camera module 101, the second camera module 102, and the processing unit 103. The image processing unit is configured to pre-process the images before the first camera module 101 and the second camera module 102 transmit the obtained images to the processing unit 103. For example, the image processing unit performs 3A processes to the original images, wherein the 3A processes is auto focus process, auto balance process, and auto exposure process, respectively. Furthermore, in some embodiments, the image stitching processing system 100 further includes the speed measuring unit 106 for measuring the current speed of the vehicle (e.g., a car).

Figure 2B:
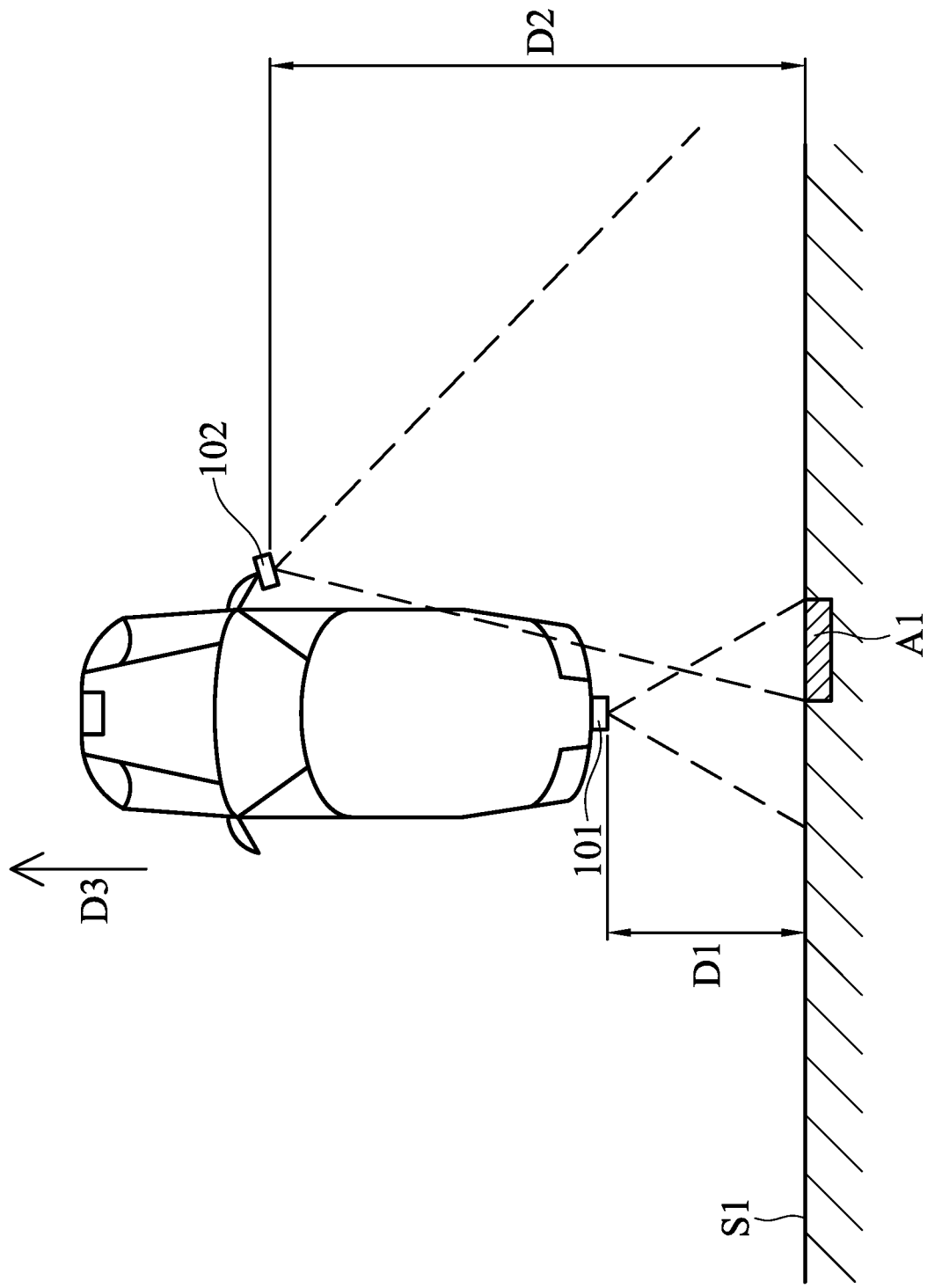

It should be noted that when the second camera module 102 is disposed at the side view mirror, if the second camera module 102 shoots images in a direction perpendicular to the reference plane S, most of the obtained images may be the body of the vehicle (as shown in FIG. 2A). Therefore, when the second obtained camera module 102 is disposed the shooting direction of the second camera module 102 can be biased toward the outside of the vehicle (as shown in FIG. 2B) to prevent the images obtained by the second camera module 102 have too many images of the body of the vehicle. Furthermore, when the second camera module 102 is disposed in the manner of FIG. 2B, the obtained image may be skewed. Therefore, before the processing unit 103 performs image stitching, additional image rectification may be performed on the image output by the second camera module 102 by the image processing unit discussed above or the processing unit 103. The image distortion caused by the skewed shooting direction can be corrected by distorting the second image appropriately to prevent the final produced image incompatibility. The embodiments of the present disclosure may adopt self-development or various public or conventional image correction techniques, and the second image 320 output by the second camera module 102 in the following embodiments is the image that has been corrected.

Figure 3:
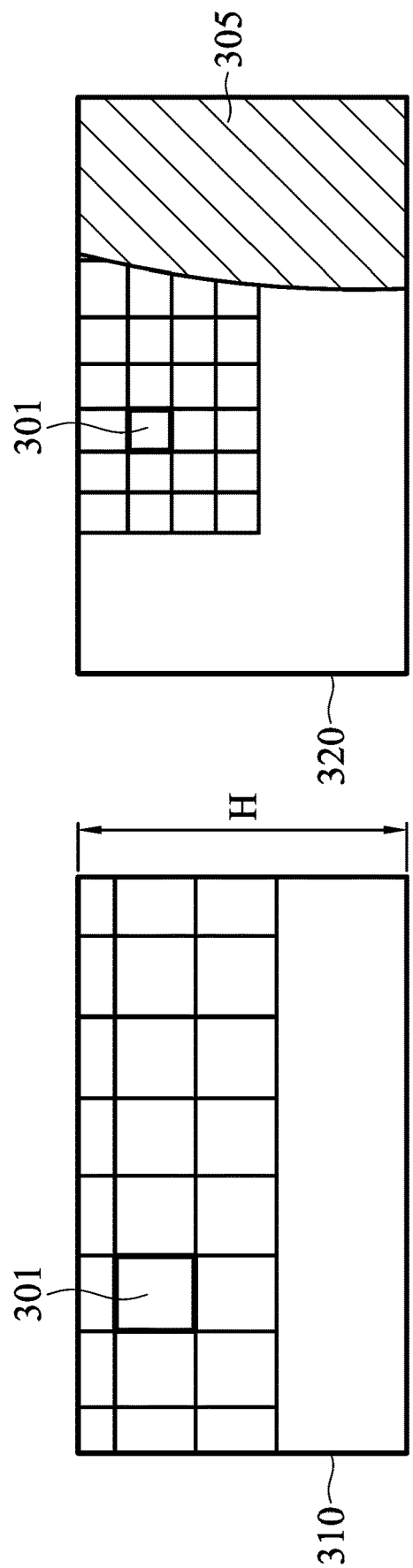
FIG. 3 illustrates images obtained by the first camera module and the second camera module, in accordance with some embodiments of the present disclosure.

FIG. 3 illustrates images obtained by the first camera module and the second camera module, in accordance with some embodiments of the present disclosure. The arrangement of the first camera module 101 and the second camera module 102 are as shown in FIG. 2B. As shown in FIG. 3, a first image 310 is the image obtained by the first camera module 101, and a second image 320 is the image obtained by the second camera module 102. As shown in FIG. 2B, since a part of the shooting range of the second camera module 102 is blocked by the body of the vehicle, the second image has a part of the body of the vehicle as shown by the area 305 in FIG. 3. Since the distance of the first camera module 101 from the reference plane S1 and the distance of the second camera module 102 from the reference plane S1 are different, the size of the obtained images corresponding to the same object are different. For example, in response to the object being closer to the camera module, the image of the object will occupy more and more pixels in the entire image. In contrast, in response to the object being farther away from the camera module, the image of the object will occupy fewer and fewer pixels in the entire image. For example, as shown in FIG. 3, if the reference plane S1 has a plurality of squares 301 with the same size, since the first image 310 is obtained by the first camera module 101 and the second image 320 is obtained by the second camera module 102, the size of the squares 301 are not the same in the first image 310 and the second image 320. Namely, the size corresponding to the square 301 in the first image 310 will be larger than the size corresponding to the square 301 in the second image 320. However, if the processing unit 103 directly stitching the first image 310 and the second image 320, there will be a problem that the image sizes of the object are inconsistent and the shooting range is overlapped. Therefore, in order to solve the above problem, before the two images are stitched, the first image 310 is taken as a reference, a target area that does not overlap the first image 310 (preferably adjacent to the first image 310) is taken out from the second image 320. The height of the target area is enlarged to be the same height as the first image 310, such that the squares 301 shown in the two images are the same size (or as identical as possible). Alternatively, in another embodiment, after obtaining the target area, the second image 320 is also taken as a reference, the first image 310 is shrunk, such that the height of the first image 310 is the same as the height obtained by the second image 320.

Figure 4A:
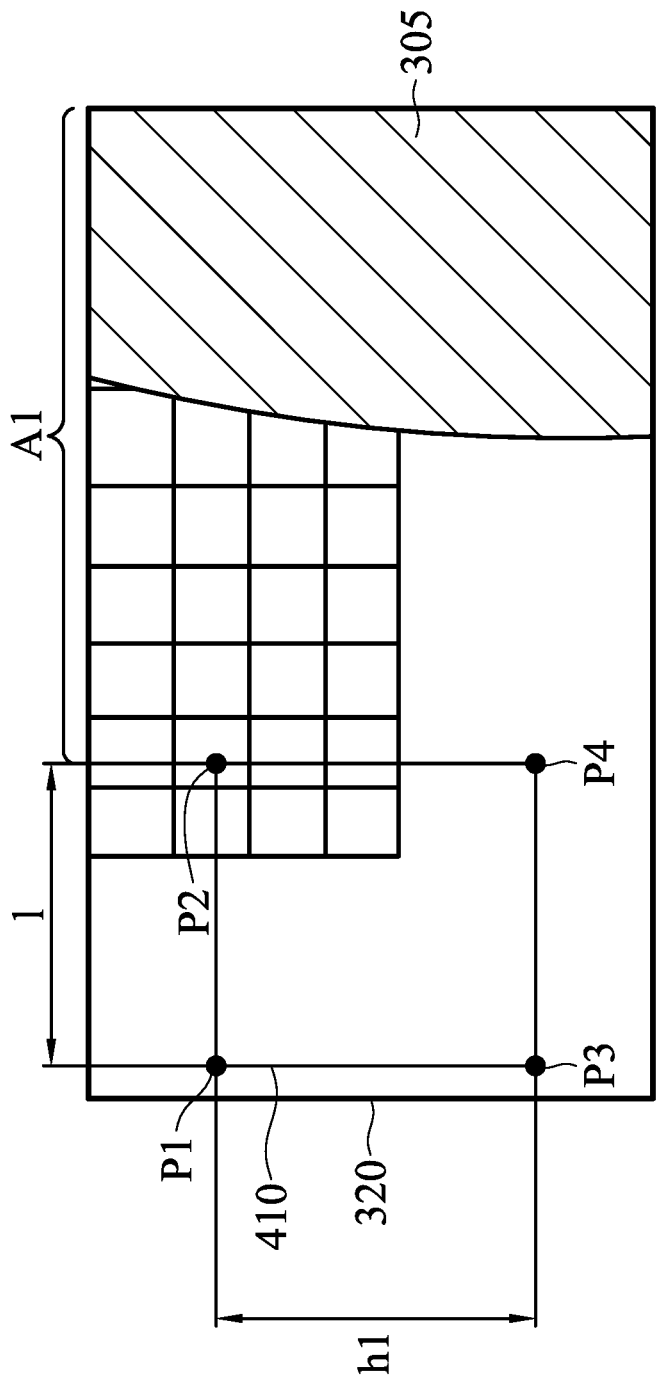
FIGS. 4A and 4B illustrate an area that does not overlap the first image but adjacent to the first image is taken out from the second image, in accordance with some embodiments of the present disclosure.
Figure 4B:
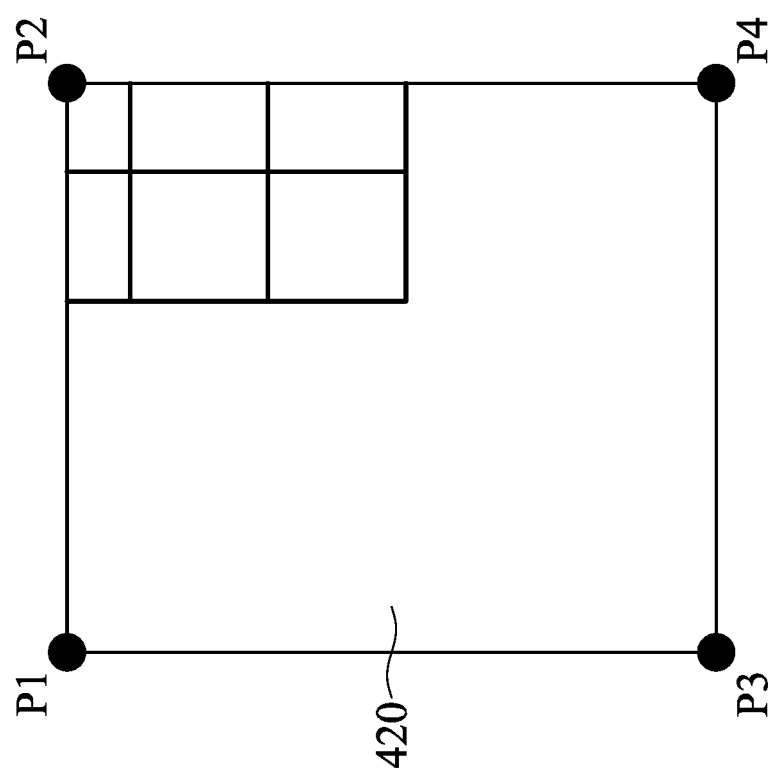

FIGS. 4A and 4B illustrate a target area that does not overlap the first image but is adjacent to the first image is taken out from the second image, in accordance with some embodiments of the present disclosure. In this embodiment, the arrangement of the first camera module 101 and the second camera module 102 is similar to that shown in FIG. 2. That is, the first camera module 101 and the second camera module 102 have an overlapping shooting width A1, and the first distance D1 corresponding to the first camera module 101 is smaller than the second distance D2 corresponding to the second camera module 102. In other words, compared with the object image obtained by the first camera module 101, the image size of the object included in the second image 320 obtained by the second camera module 102 is smaller, but the corresponding shooting range is larger. Furthermore, in this embodiment, since the second image 320 is enlarged based on the first image 310, when the processing unit 103 stitches the images, the processing unit 103 will not change the display content of the first image 310 and will only crop and enlarge the second image 320. That is, since the image size corresponding to the same object in the second image 320 is smaller than the first image 310, the display content in the second image 320 is enlarged according to a predetermined ratio. In some embodiments, the predetermined ratio is a ratio of the second distance D2 to the first distance D1. However, in order for the enlarged height to be the same as the height of the first image 310, the processing unit 103 crops the height of the second image. For example, as shown in FIG. 3, since the size of the square 301 in the second image 320 is the same as the square 301 in the first image 310 after being enlarged by the predetermined ratio, the height of the area to be enlarged in the second image 320 may be obtained by dividing the height H of the first image 310 by the predetermined ratio. For example, as shown in FIG. 4A, the height h1 corresponding to the target area 410 in the second image 320 is the height H of the first image 310 divided by the predetermined ratio, and a portion of the image corresponding to heights other than h1 will be deleted. Furthermore, according to the display content in the first image 310, the processing unit 103 can obtain a part to be stitched with the display content of the left half of the first image 310. The length 1 of the target area 410 corresponds to the width of the field of view behind the vehicle, and it can be adjusted according to the needs of the user. FIG. 4B shows the modified second image 420. In other words, the manufacturer or the service provider or the user can pre-set the coordinates of the range of the target area 410 to be cropped from the second pattern 320. For example, the target area 410 to be cropped is set to be the range selected by the coordinates P1, P2, P3, and P4. Regardless of how the display content of the second image 320 changes, the processing unit 103 fixedly crops the image in the range of P1 to P4 to serve as the modified second image 420. In some embodiments, the image within target area 410 is referred to as a sub-image. In some embodiments, after the sub-image is cropped from the target area 410, the sub-image is enlarged to obtain the modified second image 420 (i.e., the enlarged sub-image is the modified second image 420).

Figure 5:
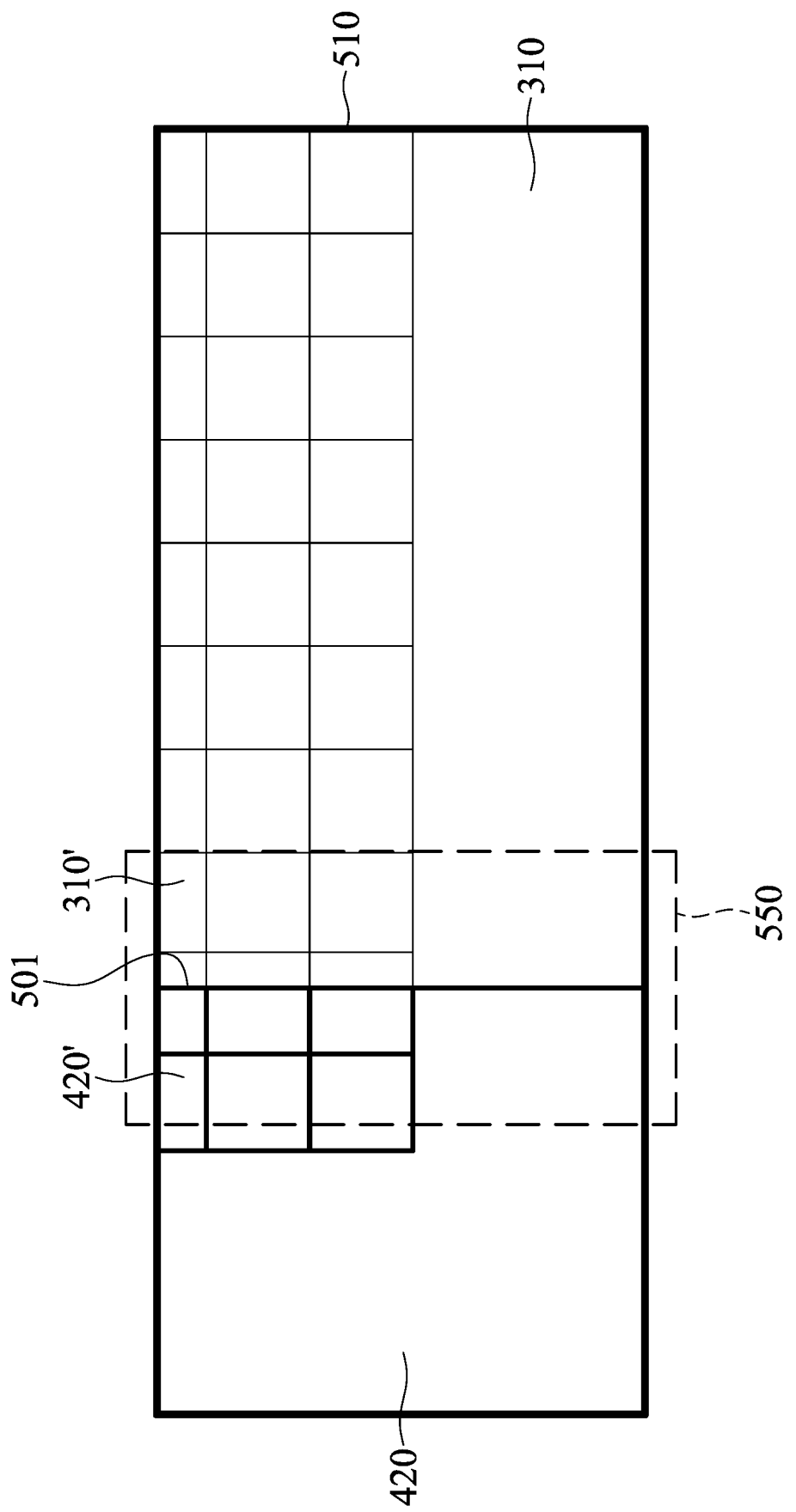
FIG. 5 illustrates a third image after stitching, in accordance with some embodiments of the present disclosure.

FIG. 5 illustrates a third image after stitching, in accordance with some embodiments of the present disclosure. After the modified second image 420 is obtained, the processing unit 103 stitches the modified second image 420 with the first image 310 to obtain a third image 510. Since the second camera module 102 is located on the left side of the first camera module 101 (based on the shooting directions of the first camera module 101 and the second camera module 102), the modified second image 420 is located on the left side and the first image 310 is on the right side when stitching. It should be noted that if the stitched third image 510 is to show or simulate the rear view image displayed by the interior rearview mirror for the user, the stitched third image is further processed by the lateral inversion of the image processing. This situation is not considered herein, but only discussed in a simple stitching manner.

However, since the object behind the vehicle does not necessarily be on the plane corresponding to the reference plane S1, for the image obtained by the second camera module 102, after the image is enlarged by the predetermined ratio corresponding to the reference plane S1, the size of the object image is not the same as the object image corresponding to the first image, such that the problem that the inconsistent object image is still occur. For example, when the object appears between the reference plane S1 and the vehicle, since the distance between the object and the second camera module 102 is smaller than the distance between the second camera module 102 and the reference plane S1, the predetermined ratio corresponding to the reference plane S1 will be too large for the object such that the size of the object in the modified second image 420 will be larger than the size of the object in the first image 310. On the other hand, when the object appears behind the reference plane S1, since the distance between the object and the camera module 101 is greater than the distance between the second camera module 102 and the reference plane S1, the predetermined ratio corresponding to the reference plane S1 will be too small for the object such that the size of the object in the modified second image 420 is smaller than the size of the object in the first image 310. Since the size of the object in the first image and the size in the modified second image are inconsistent in response to the object does not appear on the reference plane S1, the technical means used in the embodiments of the present disclosure replaces the image of the object passing through the stitching line 501 to prevent a situation wherein the driver cannot correctly perform the corresponding reaction according to the object image because the distorted object image appears in the third image 510. In detail, as shown in FIG. 5, in an embodiment of the present disclosure, we can pre-define an observation area 550 from both sides of the stitching line at first, the observation area 550 is composed of a first observation sub-area 310' corresponding to the first images 310 and a second observation sub-area 420' corresponding to the modified second images 420. The first observation sub-region 310' is equal in width to the second observation sub-region 420' and is symmetric with respect to the stitching line 501.

Figure 6B:
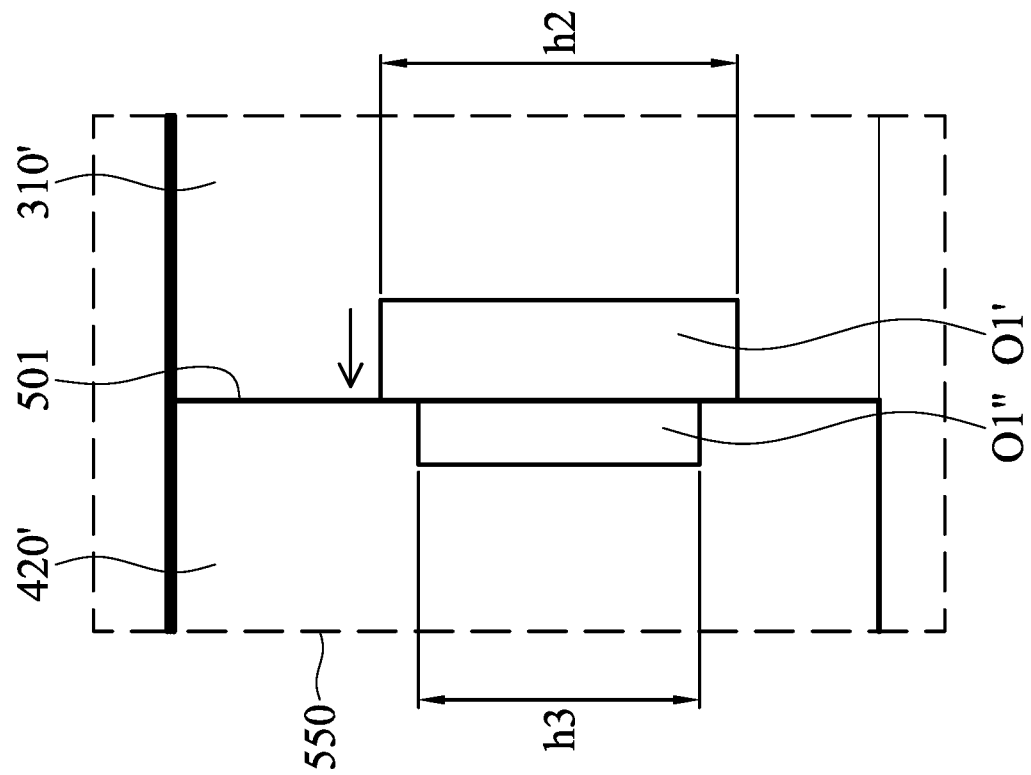
FIGS. 6A and 6B illustrate a distortion of the object image, in accordance with some embodiments of the present disclosure.
Figure 6A:
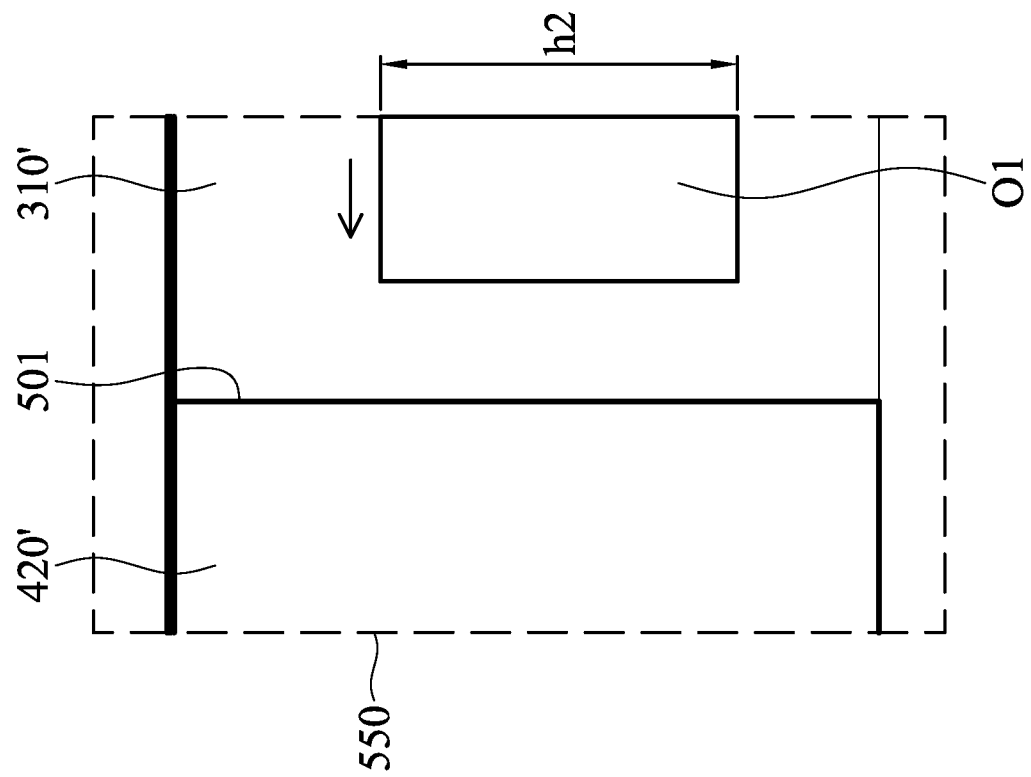

FIGS. 6A and 6B illustrate a distortion of the object image, in accordance with some embodiments of the present disclosure. In this embodiment, an object O1 appears behind the reference plane S1. As shown in FIG. 6A, when the object O1 enters the shooting range of the second camera module 102 from the shooting range of the first camera module 101, the predetermined ratio corresponding to the reference plane S1 is too small for the object located in the shooting range of the second camera module 102. Thus, when the object O1 enters the shooting range of the second camera module 102 from the shooting range of the first camera module 101 (i.e., after the object O1 intersects the stitching line 501), the height of the object image corresponding to the object O1 will be reduced from h2 to h3. That is, the object O1 will be divided into an object O1' and an object O1", and the object O1' entering the shooting range of the second camera module 102 will be shrunk. On the other hand, as shown in FIGS. 7A and 7B, in response to the same object entering the shooting range of the first camera module 101 from the shooting range of the second camera module 102, the object O1 is similarly divided into an object O1' and an object O1", and the object O1' entering the shooting range of the first camera module 101 will be enlarged. That is, the height of the object image corresponding to the object O1 will be enlarged from h4 to h5.

However, in order to avoid the display image incompatibility caused by the distorted image discussed above, when the object image starts to be distorted, the processing unit 103 replaces the distorted object image with the complete object image. For example, in response to an object image appears in the observation area 550, the processing unit 103 calculates an identification confidence value corresponding to the object (this represents an indicator including various image identification success rates). Before performing the image stitching processing system of the present embodiment, the user can train an object identification module (e.g., Tiny YOLO) by a machine learning algorithm by the processing unit 103 at first, so that the processing unit 103 can obtain the identification confidence value of the object appearing in the current image taken by the object identification module. In some embodiments, the concept of YOLO is to crop an image into a plurality of squares of the same size. Each of squares is centered on itself to determine the identification confidence value and type of objects contained in multiple surrounding squares. In other words, the more features of the same object obtained, the higher the corresponding confidence value. When the identification confidence value of the object is greater than a predetermined value (second predetermined value) (e.g., 0.9), most of the object has appeared in the observation area 550, the processing unit 103 will capture the current object image as a standard object image and store it in the storage unit 104. For example, as shown in FIG. 6A or FIG. 7A, since most of the object O1 appears in the first observation sub-region 310' or in the second observation sub-region 420', the processing unit 103 stores a standard object image corresponding to the object O1. In some embodiments, when the standard object image is obtained, the processing unit 103 removes a background of the original object image, and repairs the object image into a rectangle according to the height and width of the object, so that the size of the standard image can be directly adjusted and covered according to its height and width, when covering the object image.

Figure 8A:
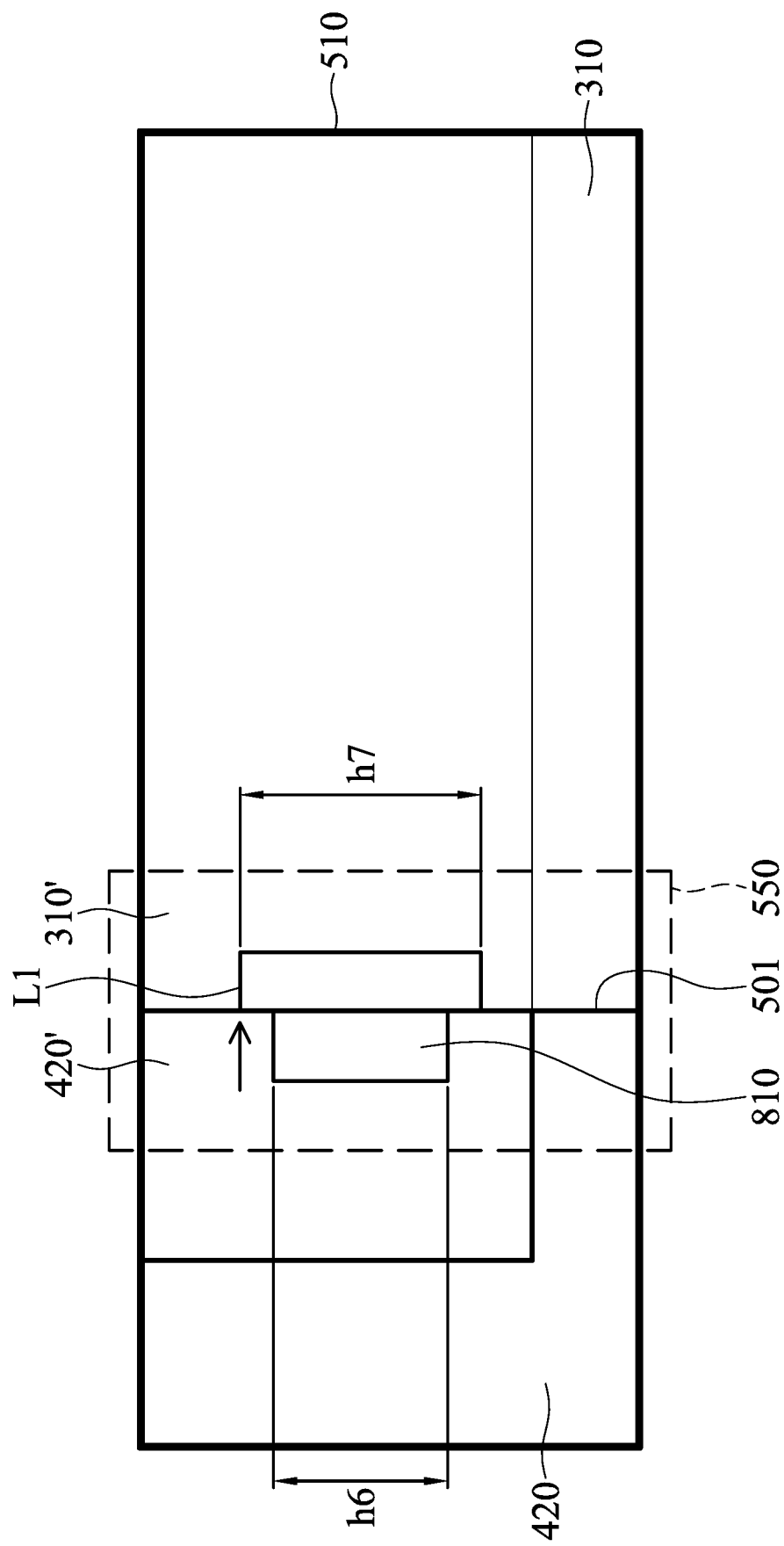
FIGS. 8A and 8B illustrate a distortion and an adjustment of the object image, in accordance with some embodiments of the present disclosure.
Figure 8B:
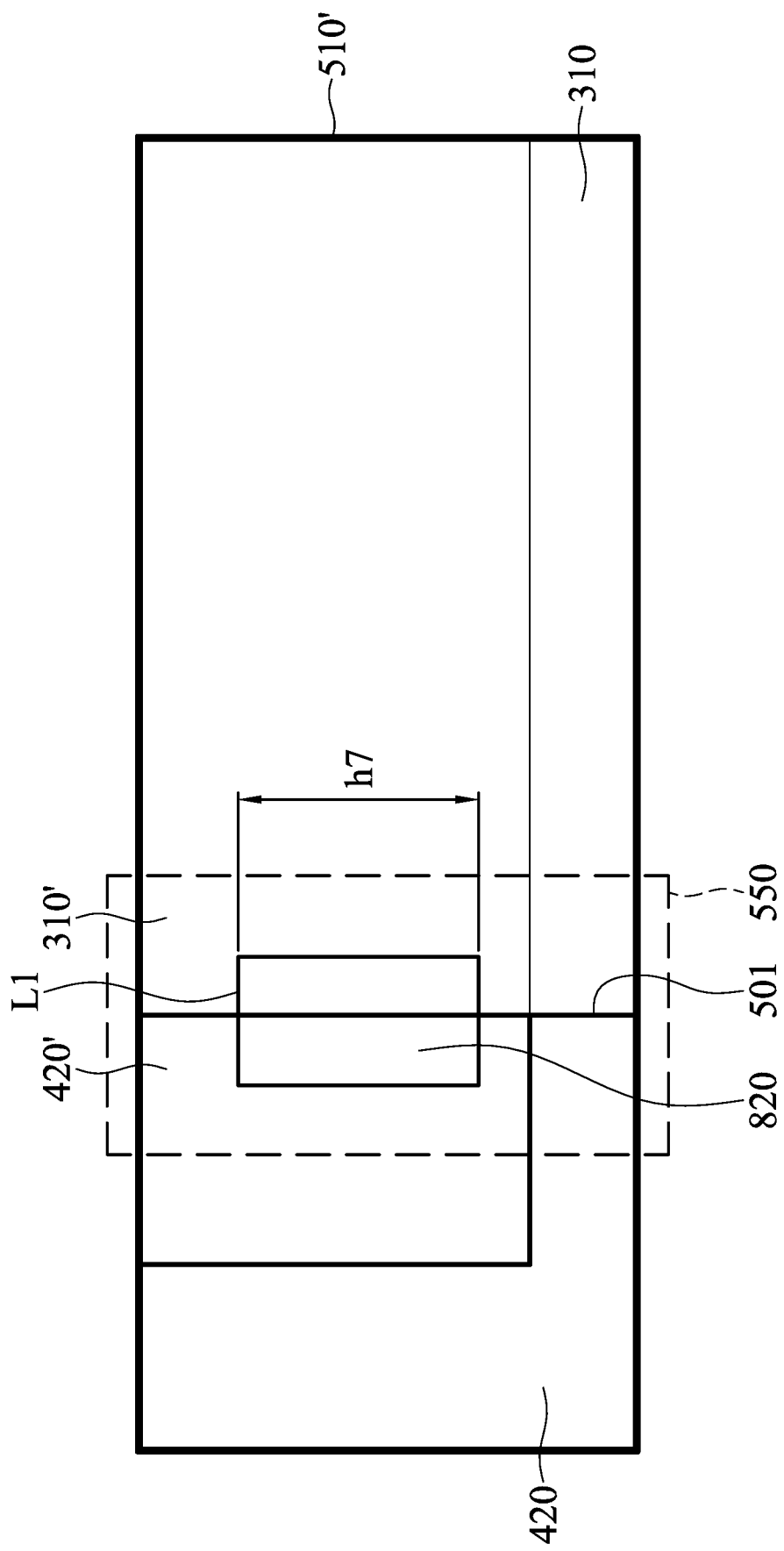

As shown in FIG. 8A, in response to the object intersects the stitching line 501, which causes the object to start to distort, the corresponding identification confidence value of the object will start to decrease. When the identification confidence value of the object image is lower than another predetermined value (the first predetermined value) (e.g., 0.6), the object image may affect the user's judgment, and the processing unit 103 replaces the distorted object image with the standard object image. The setting of the first predetermined value can be adjusted according to the requirements of the user, and is not limited to the present disclosure. When the distorted object image is replaced by the standard object image, its height will be adjusted with the height of the current object image. For example, in response to the object moving from the second observation sub-region 420' to the right to the first observation sub-region 310', since the standard object image stored by the processing unit 103 should be obtained from the second observation sub-region 420', the height of the standard object image should be h6. When the processing unit 103 wants to cover the standard object image on the distorted object image, the standard object image is adjusted according to the maximum height of the distorted object image (i.e., h7). In other words, the processing unit 103 enlarges the entire standard object image according to the ratio of the maximum height h7 to the height h6 to obtain an adjusted standard object image. The processing unit 103 covers the adjusted object image on the distorted object image 810 (i.e., a part of the object corresponding to the width L1 is covered entirely) to become the standard object image 820 as shown in FIG. 8B, and then produces a modified third image 510'. In contrast, in response to the object moving from the first observation sub-region 310' to the left to the second observation sub-region 420', since the standard object image stored by the processing unit 103 should be obtained from the first observation sub-region 310', the height of the standard object image should be h7. When the processing unit 103 wants to cover the standard object image on the distorted object image, since the height of the distorted object image is reduced to h6 (i.e., the standard object image corresponding to the height h7 can completely cover the distorted object), the processing unit 103 does not need to adjust the standard object image, and directly covers the standard object image on the distorted object image.

According to some embodiments, when the identification confidence value is less than the first predetermined value (generally when the object enters the observation area 550), the processing unit 103 can cover the standard object image on the original object image (regardless of whether the object image intersects the stitching line 501). According to other embodiments, the processing unit 103 can cover the standard object image on the original image when the object image intersects the splicing line 501 and the identification confidence value is less than the first predetermined value. Furthermore, in some embodiments, in order to prevent the object image and the standard object image from being switched too frequently, in response to a speed measuring unit of the image stitching processing system detects that the current speed of the vehicle (e.g., a car) is greater than a predetermined speed, the processing unit 103 stops determining the identification confidence value of the object image and stops the replacement operation at the same time. Furthermore, the processing unit 103 may start to calculate the identification confidence value before the object image enters the observation area 550. In other words, when the object image appears at any of the third image 510, the processing unit 103 starts to calculate the identification confidence value, and stores the corresponding image which the identification confidence value is greater than the second predetermined value. The standard object image can be continuously updated based on the increase in its identification confidence value. Alternatively, in other embodiments, the standard object image may be replaced by a fixed template.

Figure 9A:
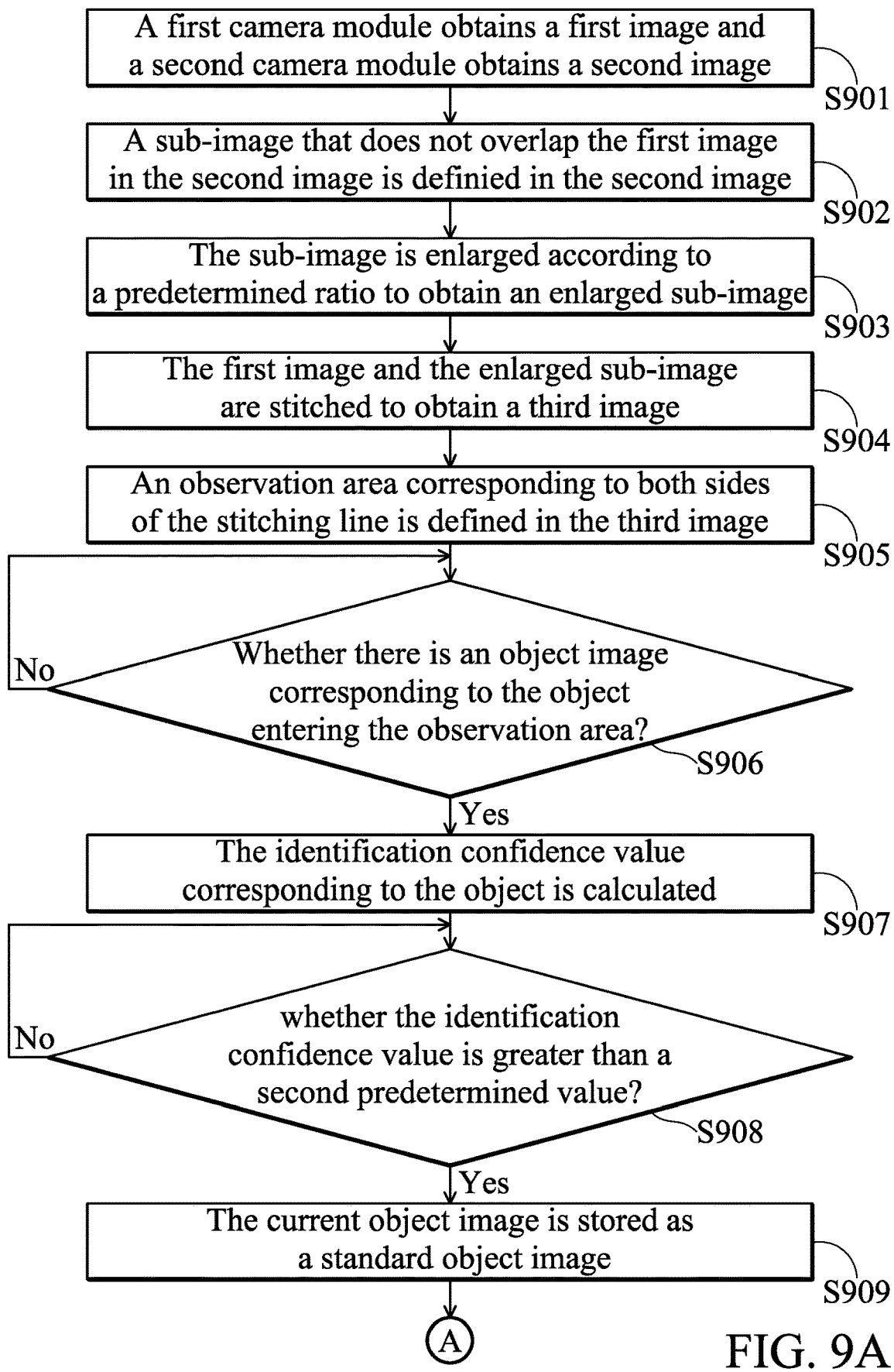
FIGS. 9A and 9B illustrate a flow chart of an image stitching processing method, in accordance with some embodiments of the present disclosure.
Figure 9B:
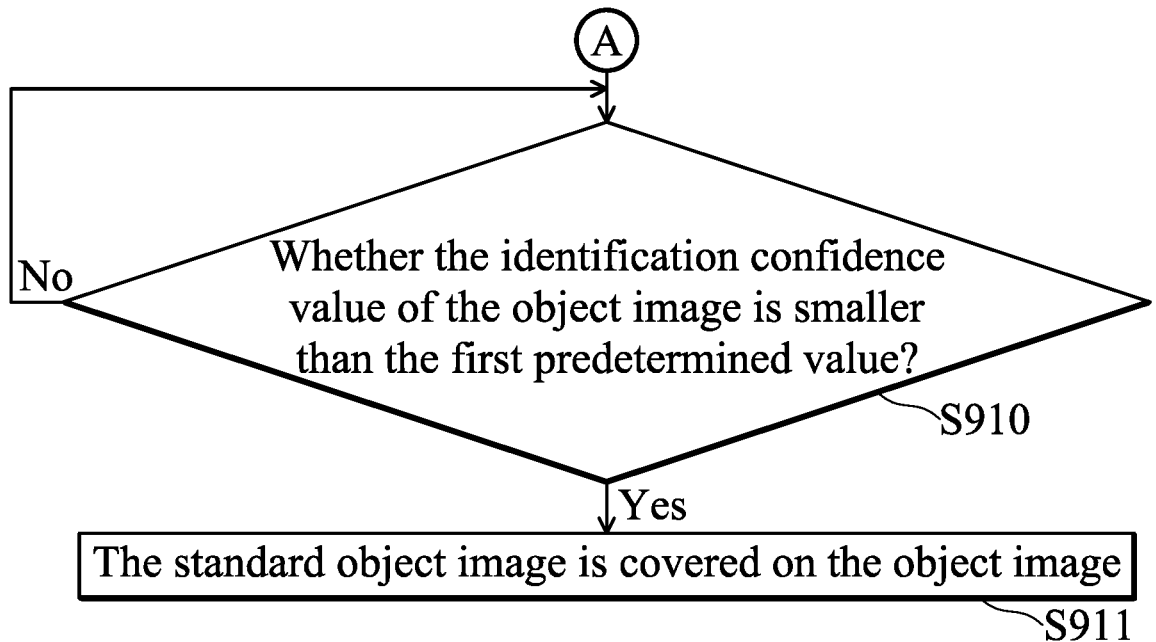

FIGS. 9A and 9B illustrate a flow chart of an image stitching processing method, in accordance with some embodiments of the present disclosure. First, in step S901, a first camera module 101 obtains a first image and a second camera module 102 obtains a second image. The first camera module 101 and the second camera module 102 are disposed in different planes with respect to a reference plane, and have different distances from the reference plane, respectively. In step S902, after the second image is obtained, the processing unit 103 defines a target area 410 in the second image. In some embodiments, the image within the target area 410 is referred to as a sub-image. Since the first camera module 101 and the second camera module 102 have different distances from the reference plane S1, the sizes of the images corresponding to the same object in the images obtained by the two camera modules are different. Therefore, in step S903, the processing unit 103 enlarges the image within the target area 410 according to a predetermined ratio to obtain a modified second image, so that the size of the display content of the target area 410 is substantially the same as the size of the display content of the first image. In the present embodiment, the predetermined ratio is a ratio of the second distance D2 to the first distance D1, the second distance D2 is the distance from the reference plane S1 to the second camera module 102, the first distance D1 is the distance from the reference plane S1 to the first camera module 101. After the modified second image is obtained, in step S904, the processing unit 103 further stitches the first image and the modified second image to obtain a third image.

In step S905, in order to further process the object image passing through the stitching line, the processing unit 103 further defines an observation area corresponding to both sides of the stitching line in the third image. In step S906, the processing unit 103 determines whether there is an object image corresponding to the object entering the observation area. When the object image appears in the observation area, the method proceeds to step S907. In step S907, the processing unit 103 calculates the identification confidence value corresponding to the object by the object identification module. When the more features of the object image are obtained (i.e., the more complete the object), the higher the identification confidence value is. In step S908, the processing unit 103 determines whether the identification confidence value is greater than a second predetermined value. In response to the identification confidence value is greater than the second predetermined value, the method proceeds to step S909. In step S909, the processing unit 103 captures the current object image from the first image or the modified second image and stores it as a standard object image. In step S910, the processing unit 103 determines whether the identification confidence value of the object image is smaller than the first predetermined value. When the identification confidence value of the object image is smaller than the first predetermined value, the object image may have been distorted, the method proceeds to step S911. In step S911, the processing unit 103 accesses the standard object image from the storage unit 104, and covers the standard object image on the object image. Before the processing unit 103 covers the standard object image on the distorted object image, the standard object image is adjusted according to the maximum height of the distorted object image, so that the standard object image can completely cover the distorted object image.

The discussion of the foregoing embodiments is based on stitching the first image obtained by the first camera module 101 and the second image obtained by the second camera module 102 in FIG. 1 and FIG. 2A into the third image. However, the present disclosure is not limited thereto. In practical applications, for example, the vehicle (such as a car), the second camera modules 102 may be respectively disposed at the left side view mirror and right side view mirror. Therefore, the first image located at the center and the second images located at the left and right sides are stitched to form the third image. Of course, in other applications, the present disclosure can also be applied to the stitching process of more images.

In summary, according to the image stitching processing method and system thereof in some embodiments of the present disclosure, when the object image is completely presented in the stitched image captured and stitched by two or more camera modules, it is captured and stored in the storage unit in advance (as the standard object image discussed above). When the object image is at the stitching line or adjacent to stitching line, the stitched object image is abnormal, the complete object image is taken out from the storage unit to cover the distorted object image, so as to prevent the user making an incorrect judgment due to a distorted object image.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An image stitching processing method, comprising:
    obtaining a first image taken by a first camera module, wherein the first camera module is disposed a first distance from a reference plane;
    obtaining a second image taken by a second camera module, wherein the second camera module is disposed a second distance from the reference plane, and the second distance is different from the first distance;
    scaling the second image according to a predetermined ratio and stitching the scaled second image with the first image to obtain a third image, wherein the third image has a stitching line between the first image and the scaled second image;
    determining whether an object image corresponding to an object in the third image is close to or located on the stitching line;
    identifying the object image to generate an identification confidence value;
    covering a standard object image on the object image to generate a modified third image in response to the object image being close to or located on the stitching line and the identification confidence value of the object image being less than a first predetermined value; and
    outputting and displaying the modified third image.

2. The image stitching processing method as claimed in claim 1, wherein the step of determining whether the object image in the third image is close to the stitching line comprises:
    defining an observation area by extending an equal distance from both sides of the stitching line; and
    determining whether the object image enters the observation area.

3. The image stitching processing method as claimed in claim 1, wherein the step of scaling the second image according to the predetermined ratio and stitching the scaled second image with the first image to obtain the third image comprises:
    defining a target area that does not overlap the first image in the second image, and cropping the second image according to the target area to obtain a sub-image;
    enlarging the sub-image according to the predetermined ratio to obtain the scaled second image; and
    stitching the first image with the scaled second image to obtain the third image.

4. The image stitching processing method as claimed in claim 1, wherein the predetermined ratio is a ratio of the second distance to the first distance.

5. The image stitching processing method as claimed in claim 1, further comprising:
    calculating the identification confidence value of the object image in response to the object image being close to or located on the stitching line; and
    storing a current object image as the standard object image in response to the identification confidence value being greater than a second predetermined value.

6. The image stitching processing method as claimed in claim 1, wherein the step of covering the standard object image on the object image in response to the object image being close to or located on the stitching line and the identification confidence value of the object image being less than the first predetermined value comprises:
    adjusting a height of the standard object image according to a height of the object image corresponding to a part of the first image to obtain an adjusted standard object image, wherein
    a height of the adjusted standard object image is equal to the height of the object image corresponding to the part of the first image; and
    covering the adjusted standard object image on the object image.

7. The image stitching processing method as claimed in claim 1, wherein the first camera module and the second camera module are configured on a vehicle, and the image stitching processing method further comprises:
    stopping calculating the identification confidence value corresponding to the object image and/or stopping covering the standard object image on the object image in response to a current speed of the vehicle being greater than a predetermined speed.

8. The image stitching processing method as claimed in claim 1, wherein the second image is correspondingly enlarged according to the predetermined ratio and the enlarged second image is stitched with the first image to obtain the third image, when the second distance is greater than the first distance.

9. An image stitching processing system, comprising:
    a first camera module, configured to obtain a first image, wherein the first camera module is disposed a first distance from a reference plane;
    a second camera module, configured to obtain a second image, wherein the second camera module is disposed a second distance from the reference plane, and the second distance is different from the first distance;
    a processing unit, configured to:
        receive the first image and the second image from the first camera module and the second camera module;
        scale the second image according to a predetermined ratio and stitch the scaled second image with the first image to obtain a third image, wherein the third image has a stitching line between the first image and the scaled second image;
        determine whether an object image corresponding to an object in the third image is close to or located on the stitching line;
        identify the object image to generate an identification confidence value; and
        cover a standard object image on the object image to generate a modified third image in response to the object image being close to or located on the stitching line and the identification confidence value of the object image being less than a first predetermined value;
    a storage unit, configured to store the standard object image; and
    a display unit, configured to display the modified third image.

10. The image stitching processing system as claimed in claim 9, wherein the processing unit defines an observation area by extending an equal distance from both sides of the stitching line, and determines whether the object image enters the observation area.

11. The image stitching processing system as claimed in claim 9, wherein the processing unit further defines a target area that does not overlap the first image in the second image, and crops the second image according to the target area to obtain a sub-image; enlarges the sub-image according to the predetermined ratio to obtain the scaled second image; and stitches the first image with the scaled second image to obtain the third image.

12. The image stitching processing system as claimed in claim 9, wherein the predetermined ratio is the ratio of the second distance to the first distance.

13. The image stitching processing system as claimed in claim 9, wherein:
the processing unit further calculates the identification confidence value of the object image in response to the object image being close to or located on the stitching line; and
the processing unit further stores a current object image as the standard object image in response to the identification confidence value being greater than a second predetermined value.

14. The image stitching processing system as claimed in claim 9, wherein the processing unit further adjusts a height of the standard object image according to a height of the object image corresponding to a part of the first image to obtain an adjusted standard object image, and covers the adjusted standard object image on the object image, wherein a height of the adjusted standard object image is equal to the height of the object image corresponding to the part of the first image.

15. The image stitching processing system as claimed in claim 9, wherein the first camera module and the second camera module are configured on a vehicle, and the processing unit further stops calculating the identification confidence value corresponding to the object image and/or stops covering the standard object image on the object image in response to the current speed of the vehicle being greater than a predetermined speed.

16. The image stitching processing system as claimed in claim 9, wherein the processing unit correspondingly enlarges the second image according to the predetermined ratio and the enlarged second image is stitched with the first image to obtain the third image, when the second distance is greater than the first distance.

17. An image stitching processing method, comprising:
obtaining a first image and a second image, wherein the first image is adjacent to the second image or the first image overlaps with at least a portion of the image content of the second image;
scaling at least one of the first image and the second image according to a ratio, and stitching the scaled first image and the scaled second image or stitching the scaled one of the first image and the second image with the other to obtain a third image, wherein the third image has a stitching line between the scaled first image and the scaled second image or stitching the scaled one of the first image and the second image with the other;
determining whether an object image in the third image is located on the stitching line;
identifying the object image to generate an identification confidence value;
covering a standard object image on the object image to generate a modified third image in response to the object image being located on the stitching line and the identification confidence value of the object image being less than a first predetermined value; and
outputting and displaying the modified third image.

* * * * *